United States Patent Office 3,551,441
Patented Dec. 29, 1970

3,551,441
N,N' - DI - SUBSTITUTED UREAS AND ANTISEPTIC DETERGENT COMPOSITIONS CONTAINING SAME
Moneeb Hassan Zakaria, Chicago, Ill., assignor to Armour and Company, Chicago, Ill., a corporation of Delaware
No Drawing. Filed Aug. 18, 1967, Ser. No. 661,521
Int. Cl. C07d 91/46
U.S. Cl. 260—305                    7 Claims

ABSTRACT OF THE DISCLOSURE

The products resulting from the reaction of halogenated amino benzothiazoles with 3,4-dichlorophenyl isocyanate in a dry inert organic solvent are disclosed. These products have a high degree of activity against bacteria such as *S. aureus* 209 and are thus useful as the active ingredients in antiseptic compositions.

---

This invention relates to derivatives of halogenated amino benzothiazoles which show germicidal activity in soap or another detergent compositions. These derivatives appear to be N,N'-di-substituted ureas in which one of the substituents is a halogenated phenyl group, such as 3,4-dichlorophenyl isocyanate, and the other substituent is a halogenated benzothiazole, such as 6-chlorobenzothiazole.

These N,N-disubstituted ureas are the reaction products of approximately equimolar amounts of (A) a halogenated amino benzothiazole of the formula:

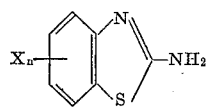

wherein X is a halogen such as chlorine or bromine and $n$ is an integer from 1 to 2 and (B) a halogenated phenyl isocyanate of the formula:

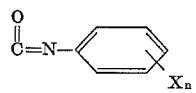

wherein X and $n$ are as described above; in the presence of a dry inert organic solvent such as dry ether, benzene or toluene.

The reaction stoichiometry is satisfied when the reactants are present in equimolar ratio. However, it is preferred that a slight excess of the isocyanate reactant be present to take up any moisture present and be removed with boiling acetone after the reaction is completed.

The addition sequence of the reactants is not critical; either reactant may be added to the other in the reaction medium.

Any dry inert organic solvents may be used, such as ether, benzene, toluene, xylene and the like aliphatic or aromatic hydrocarbons. The solvent should be previously dried by any of the known means, such as drying over magnesium sulfate, sodium sulfate or the like.

Temperature is not critical to the operability of the present process. Generally, temperatures from about 20° C. to 30° C. are desirable. The reaction is exothermic, so that initial slight warming is generally satisfactory. When a solvent such as ether is used, the reaction may be run at room temperature without any warming.

The reaction is complete in from 5 to 20 minutes. Thereafter, it may be allowed to cool at room temperature for about 1½ hours before separating the precipitate. The product may be separated by any conventional sedimentation means, such as centrifugation, filtering and the like.

Specific examples illustrative of the preparation of the novel compositions of this invention follow:

EXAMPLE I

To 2.6 grams (0.02 mole) of 6-chloro-2-amino-benzothiazole dissolved in 50 ml. of dry ether (dried over magnesium sulfate), was added 4.0 grams (0.02 mole plus some excess) of 3,4-dichlorophenyl isocyanate. The reaction mixture was stirred at room temperature for 30 minutes, then cooled, filtered, washed with dry ether and air dried. The precipitate formed (5.5 grams, 87% yield) was then triturated in boiling acetone to remove any 3,3',4,4'-tetrachlorocarbonilide which might have been formed by the presence of moisture, filtered and air dried. The melting point of the dried reaction product was 310–320° C. (melting point tube) (product designated I–A). The product was then recrystallized from a dioxane-water mixture, triturated with hot acetone, filtered and air dried. No improvement in the melting point was observed. The product was recrystallized from butyl acetate, washed with acetone and air dried. The melting behavior of the recrystallized reaction product was as follows: it melted at 245–250° C., then turned solid and melted again at 322–323° C. (designated I–B). The elemental analysis of the recrystallized reaction product was not in agreement with the expected benzothiazolyl urea structure, which would be:

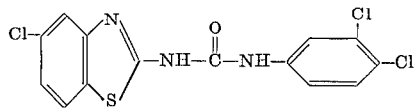

The elemental analysis is as follows:
Compound I–B (recrystallized): Theoretical (percent): H, 2.15; C, 45.2; Halogen, 28.6. Found (percent): H, 4.53; C, 51.02; Halogen, 12.21.

EXAMPLE II

To 10.0 grams (0.05 mole) of 6-bromo-2-amino-benzothiazole dissolved in 500 ml. of dry ether (dried over magnesium sulfate), was added 9.4 grams (0.05 mole) of 3,4-dichlorophenyl isocyanate. The reaction mixture was slightly warmed and stirred for one hour, filtered, washed with dry ether and air dried. The product obtained weighed 15.5 grams (80% yield). The melting point of the reaction product was 300° C. (melting point block). 13 grams of the product was then triturated with boiling acetone, filtered while hot and air dried, resulting in 12.0 grams of a product having a melting point of 297–305° C. (melting point tube) (product designation II–A). Several attempts to recrystallize the product from a variety of organic solvents failed. These solvents included acetone, isopropyl alcohol, octadecyl alcohol, benzene, toluene, ethylene dichloride, petroleum ether and ethyl acetate. The product was finally recrystallized from butyl acetate, and then triturated with hot acetone, filtered while hot and air dried to result in 12.0 grams of recrystallized product having a melting point of 240° C. to 290–300° C. (designated II–B). The elemental analysis of the reaction product was not in agreement with the expected halogenated benzothiazoyl urea structure, which would be:

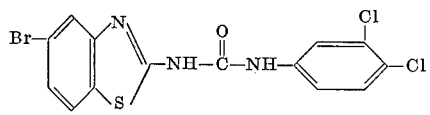

Elemental analyses are as follows:

| Compound | Percent hydrogen | | Percent carbon | | Percent halogen | |
|---|---|---|---|---|---|---|
| | Theoretical | Found | Theoretical | Found | Theoretical | Found |
| II-A (crude) | 1.92 | 2.25 | 40.04 | 40.95 | 36.2 | 12.14 |
| II-B (recrystallized) | 1.92 | 3.98 | 40.04 | 44.58 | 36.2 | 10.84 |

The infrared spectra of both the crude and the recrystallized products (II-A and II-B) were essentially different from each other, and no identification of the peaks was attempted.

EXAMPLE III

To 2.2 grams (0.01 mole) of 5,6-dichloro-2-aminobenzothiazole in 100 ml. of dry ether (dried over magnesium sulfate), was added 2.5 grams (0.01 mole and 0.06 gram excess) of 3,4-dichlorophenyl isocyanate. The reaction mixture was stirred at room temperature for 30 minutes, and filtered. The precipitate formed was then triturated with boiling acetone, filtered while hot, and air dried to yield 3.5 grams (85% yield) of a product having a melting point of 300–315° C. determined by melting point block (product designated III-A). The product was recrystallized from butyl acetate, triturated with boiling acetone, and air dried. The melting behavior of the recrystallized product was as follows: it melted at 240° C., then turned solid and melted again at 360° C. with decomposition (designated III-B).

The elemental analysis of the reaction product was not in agreement with the expected benzothiazolyl urea structure, which would be:

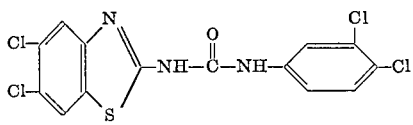

Elemental analyses are as follows:

| Compound | Percent hydrogen | | Percent carbon | | Percent halogen | |
|---|---|---|---|---|---|---|
| | Theoretical | Found | Theoretical | Found | Theoretical | Found |
| III-A (crude) | 1.72 | 3.90 | 34.7 | 45.20 | 41.2 | 21.50 |
| III-B (recrystallized) | 1.72 | 3.77 | 34.7 | 45.02 | 41.2 | 21.09 |

EXAMPLE IV

The 4-bromo derivative was prepared in exactly the same way as the 5,6-dichloro derivative set forth in Example III above, using 2.3 grams of 4-bromoaminobenzothiazole (0.01 mole) in 50 ml. dry ether and 2.2 grams of 3,4-dichlorophenyl isocyanate (0.01 mole plus 0.3 gram excess). The crude reaction product melted at 250–253° C. and no recrystallization, nor elemental analysis was attempted.

EXAMPLE V

Antiseptic activity of the N,N'-disubstituted ureas prepared in the above examples was determined as follows:

The various individual disubstituted ureas were dissolved in dimethylformamide at a 1.0% level. Suspensions in a 10% soap solution were then prepared. The "soap" utilized was a neutral white toilet soap containing about 20% by weight of sodium coco soap and about 80% by weight of sodium tallow soap. The concentration of disubstituted urea in the soap solution was 1,000 p.p.m., or 0.1%. Thereafter, serial dilutions were made containing 100 p.p.m. and 10 p.p.m., respectively, of the particular disubstituted urea.

Varying amounts of these soap solutions containing the disubstituted ureas were thoroughly dispersed into measured amounts of sterile liquid nutrient agar, so as to obtain concentrations of the disubstituted urea ranging from .1 to 20 p.p.m. Plates were then poured, allowed to solidify, and streaked with a standard 4 mm. loopful of a 24-hour broth culture of Staphylococcus aureus FDA 209. After incubation for 24 hours at 37° C., the bacteriostatic endpoint was determined. The bacteriostatic endpoint, hereinafter called the minimum inhibitory concentration, represents the minimum concentration in p.p.m. of the bacteriostatic agent necessary to completely inhibit all growth of S. aureus.

Table I gives the minimum inhibitory concentration for the 10% soap solution alone and for the 10% soap solution with the addition of each of the disubstituted ureas prepared in the above examples.

TABLE I.—CALCULATED STRUCTURE

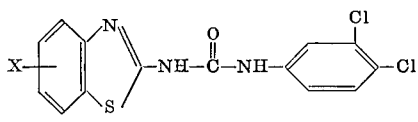

| X | Minimum inhibitory concentration (against S. aureus (p.p.m.)) | |
|---|---|---|
| | Crude reaction product | Recrystallized |
| 6-chloro | 0.1–0.5 | 0.2–0.3 |
| 6-bromo | 0.2 | >2.0 |
| 4-bromo | 1–5 | |
| 5,6-dichloro | 0.1–0.5 | |

The results obtained above, with respect to bacteriostatic activity in the specific soap mentioned above (20/80 sodium coco/tallow), are obtained with soaps generally. The activity exhibited by these compounds is independent of the soap vehicle, and other water-soluble cleansing media may be used, such as anionic and non-ionic type synthetic detergents. At the same time, soap is a system in which the compounds are highly effective. "Soap" refers to the water-soluble metallic, ammonium, or organic base salts of various fatty acids or mixtures of fatty acids such as lauric, oleic, myristic, palmitic, stearic and the like. Water-soluble soaps, such as the sodium soaps, derived from such fats and oils as tallow, coconut oil, cottonseed oil, soybean oil, corn oil, lard, greases, fish oils and the like, as well as their hydrogenated derivatives, and mixtures thereof, may be used. Further, the character of the soap or other water-soluble cleansing media may vary widely in its composition depending on whether the final soap composition is to be in powder, spray-dried, flake, bar, paste, foam, liquid or other form; and on whether additional ingredients commonly used with soaps are added. Such other ingredients include polyphosphate builders, anti-redeposition agents such as carboxymethylcellulose, brightening agents such as fluorescent dyes, bleaching agents, pigments, perfumes and the like, as long as the usual considerations of compatibility are applied.

Thus, in a further specific embodiment, my invention may be exemplified by an antiseptic detergent composition comprising a water-soluble cleansing agent, such as soap, and a germicidally effective amount of a germicidal agent, which agent comprises the reaction product of a halogenated amino benzothiazole having the formula:

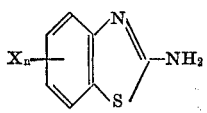

wherein X is a halogen such as chlorine or bromine and n is an integer from 1 to 2 reacting in the presence of a dry inert organic solvent with a halogenated phenyl isocyanate of the formula:

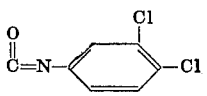

Relatively small amounts of the derivatives of halogenated amino benzothiazoles of this invention are sufficient to make the detergent composition antiseptic. The amount to be used in a particular instance will vary over a wide range depending upon such factors as the degree of effectiveness desired, the specific detergent composition, the specific reaction product employed, and cost. Generally, from 0.2% to about 5% based on the weight of the water-soluble cleansing agent will provide desirable antisepsis. It should be understood that lesser or greater amounts are operable, but without substantial advantages. A preferred range in a suitable cleansing agent such as soap, is an amount in the order of from about 1.5% to about 3%, based on the final weight of the detergent composition.

While this invention has been described with respect to certain embodiments, it is not so limited; and it is to be understood that variations and modifications thereof, obvious to those skilled in the art, may be made without departing from the spirit or scope of this invention.

What is claimed is:

1. An N,N'-di-substituted urea compound of the formula:

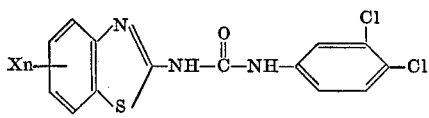

wherein X is halogen and n is an integer of 1 to 2.

2. The compounds of claim 1 in which X is chlorine.
3. The compound of claim 1 in which X is bromine.
4. A compound according to claim 1 having the formula:

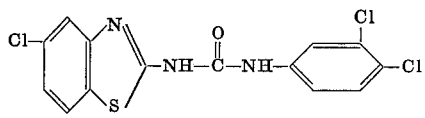

5. A compound according to claim 1 having the formula:

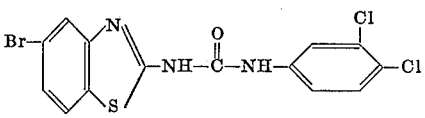

6. A compound according to claim 1 having the formula:

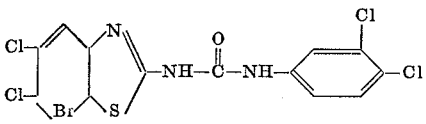

7. A compound according to claim 1 having the formula:

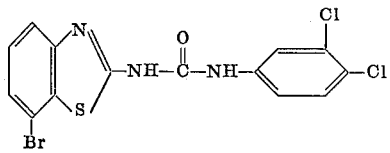

References Cited

Beaver et al. J. Am. Chem. Soc., 79, 1236–45 (1957).

ALEX MAZEL, Primary Examiner
R. J. GALLAGHER, Assistant Examiner

U.S. Cl. X.R.

252—106, 107; 424—270

UNITED STATES PATENT OFFICE
CERTIFICATE OF CORRECTION

Patent No. 3,551,441   Dated December 29, 1970

Inventor(s) Moneeb Hassan Zakaria

It is certified that error appears in the above-identified patent and that said Letters Patent are hereby corrected as shown below:

In Column 1, line 22, the term "another" should read --other--.

In Claim 6, that portion of the structure reading

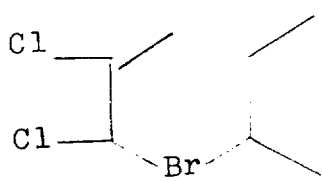   should read   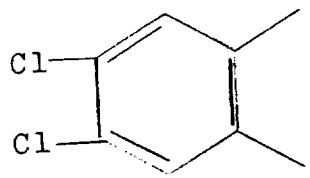

Signed and sealed this 6th day of July 1971.

(SEAL)
Attest:

EDWARD M. FLETCHER, JR.
Attesting Officer

WILLIAM E. SCHUYLER, JR.
Commissioner of Patents